(12) United States Patent
Arvidsson

(10) Patent No.: US 9,155,253 B2
(45) Date of Patent: Oct. 13, 2015

(54) DETERMINATION OF THICKNESS OF A TREE TRUNK

(75) Inventor: Hans Arvidsson, Grangärde (SE)

(73) Assignee: LOG MAX AB, Grangarde (SE)

( * ) Notice: Subject to any disclaimer, the term of this patent is extended or adjusted under 35 U.S.C. 154(b) by 1352 days.

(21) Appl. No.: 12/988,408

(22) PCT Filed: Apr. 16, 2009

(86) PCT No.: PCT/SE2009/050392
§ 371 (c)(1), (2), (4) Date: Jan. 3, 2011

(87) PCT Pub. No.: WO2009/128779
PCT Pub. Date: Oct. 22, 2009

(65) Prior Publication Data
US 2011/0088816 A1 Apr. 21, 2011

(30) Foreign Application Priority Data
Apr. 16, 2008 (SE) ........................................ 0800866

(51) Int. Cl.
*A01G 23/083* (2006.01)
*A01G 23/095* (2006.01)
(Continued)

(52) U.S. Cl.
CPC ............ *A01G 23/083* (2013.01); *A01G 23/095* (2013.01); *A01G 23/099* (2013.01); *B27L 1/06* (2013.01); *G01B 5/0035* (2013.01); *G01B 5/10* (2013.01)

(58) Field of Classification Search
CPC . A01G 23/083; A01G 23/095; A01G 23/089; A01G 23/085; A01G 23/093; B27L 1/00; B27L 1/06

USPC .............. 144/343, 338, 357, 398, 399, 24.13; 702/155, 157, 170
See application file for complete search history.

(56) References Cited

U.S. PATENT DOCUMENTS 5,097,881 A * 3/1992 Mack ............................. 144/356
6,318,425 B1 * 11/2001 Niemi ........................... 144/343
6,814,112 B2 * 11/2004 Johansson ..................... 144/338

FOREIGN PATENT DOCUMENTS

SE         518240      9/2002
WO         0015026     3/2000
(Continued)

OTHER PUBLICATIONS

SE 518240 English Translation, Inventor: Harri Suutari, Publication Date: Sep. 10, 2002.*
(Continued)

*Primary Examiner* — Shelley Self
*Assistant Examiner* — Matthew G Katcoff
(74) *Attorney, Agent, or Firm* — Renner, Otto, Boisselle & Sklar, LLP

(57) ABSTRACT

Method and device for the determination of a thickness of a cross-section (S) of a tree trunk (30) received in a harvesting assembly (10) comprising a pair of opposite feed wheels (14) engaging with the tree trunk and a delimbing knife (18) abutting against the tree trunk. The mutual position of the feed wheels is detected as a measure of a transverse dimension (D1) of the cross-section of the tree trunk. The position of the delimbing knife (18) in relation to an abutment surface (22) of the tree trunk opposite thereto is detected as a measure of an additional transverse dimension (D2) of the cross-section (S) of the tree trunk, which additional transverse dimension forms an essentially right angle with the first-mentioned transverse dimension. The thickness of the cross-section (S) of the tree trunk is calculated based on the two measures of the transverse dimensions (D1, D2).

3 Claims, 2 Drawing Sheets

(51) Int. Cl.
*B27L 1/06* (2006.01)
*A01G 23/099* (2006.01)
*G01B 5/00* (2006.01)
*G01B 5/10* (2006.01)

(56) References Cited

FOREIGN PATENT DOCUMENTS

WO 2006/092469 9/2006
WO 2006/126952 11/2006

OTHER PUBLICATIONS

Valmet 350. Datasheet [online]. Komatsu Forest, 2005, [retrieved on Jun. 30, 2009]. Retrieved from the Internet: URL: http://www.tryckshop.com/pdf/partek/Low_v350_J_gb05., pp. 3, "Precision Measurement".

International Search Report for corresponding application No. PCT/SE2009/050392 dated Jul. 7, 2009.

Office Action for corresponding Russian application No. 2010146483 Mar. 12, 2013.

* cited by examiner

DETERMINATION OF THICKNESS OF A TREE TRUNK

This application is a national phase of International Application No. PCT/SE2009/050392 filed Apr. 16, 2009 and published in the English language.

TECHNICAL FIELD

The invention relates to a method and a device for the determination of a thickness of a cross-section of a tree trunk received in a harvesting assembly comprising a pair of opposite feed wheels engaging with the tree trunk and a delimbing knife abutting against the tree trunk, comprising detection of the mutual position of the feed wheels as a measure of a transverse dimension of the cross-section of the tree trunk. The invention also relates to a harvesting assembly provided with such a device.

BACKGROUND

Upon felling and processing of tree trunks, it has to be possible to correctly determine the dimensions of the resulting logs. A remaining problem upon mechanical measuring in a harvesting assembly during operation is to sufficiently accurately determine the diameter or thickness of the logs, which in turn, together with length information, can be used for the determination of the timber volume of the resulting logs. Known harvesting assemblies usually use two or three measurement points in each diameter measuring, which may be insufficient, particularly in case of oval or otherwise irregular trunk cross-sections.

SUMMARY OF THE INVENTION

Therefore, an object of the invention is to provide a method and a device that can determine the thickness of a tree trunk at greater accuracy, and which comply with the existing measurement regulations, for instance according to "The Swedish Board of Timber Scaling" (VMR).

According to one aspect of the invention, the method also comprises a detection of the position of the delimbing knife in relation to an abutment surface of the tree trunk opposite thereto as a measure of an additional transverse dimension of the cross-section of the tree trunk, which additional transverse dimension forms an essentially right angle with the first-mentioned transverse dimension, and in addition an estimation of the thickness of the cross-section of the tree trunk based on said two measures of transverse dimensions. Thereby, each cross-section can be calculated by means of four measurement points, which increases the accuracy in the thickness determination. In principle, it is possible to attain a measuring accuracy that approaches the one in manual so-called cross calipering, which usually is used as a reference when evaluating mechanical diameter measuring.

As in cross calipering, the thickness can be calculated as a circle-diameter value in the form of a mean value of the two transverse dimensions.

In a device for the determination of the thickness, there are, in addition to sensor means for the detection of the mutual position of the feed wheels as a measure of a transverse dimension of the cross-section of the tree trunk, additional sensor means for the detection of the position of the delimbing knife in relation to an abutment surface of the tree trunk opposite thereto as a measure of an additional transverse dimension of the cross-section of the tree trunk, which additional transverse dimension forms an essentially right angle with the first-mentioned transverse dimension, as well as also means for the estimation of the thickness of the tree trunk based on said two transverse dimensions.

The sensor means may comprise position indicators arranged in the respective actuator for the movement of the feed wheels and the delimbing knife.

Other features and advantages of the invention can be seen in the claims and the following description of embodiment examples.

DETAILED DESCRIPTION OF EMBODIMENT EXAMPLES

Figure 1:
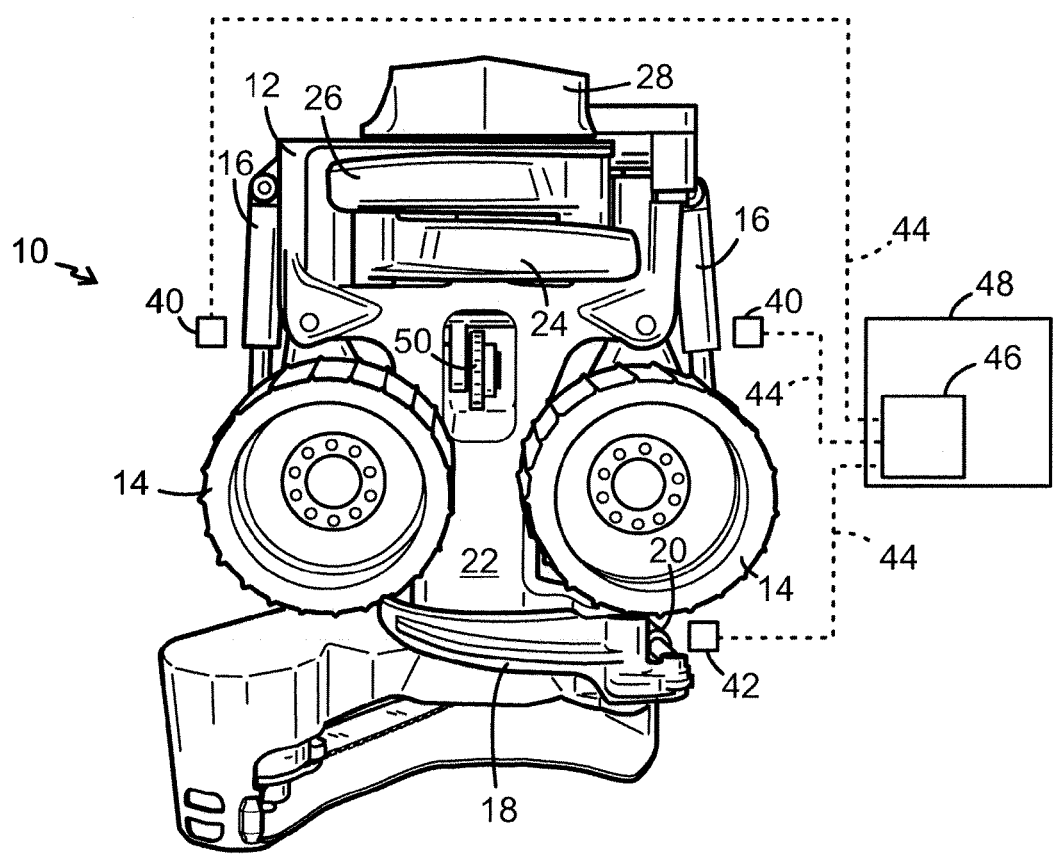
FIG. 1 is a front view of a harvesting assembly provided with a schematically represented device according to the invention.
Figure 2:
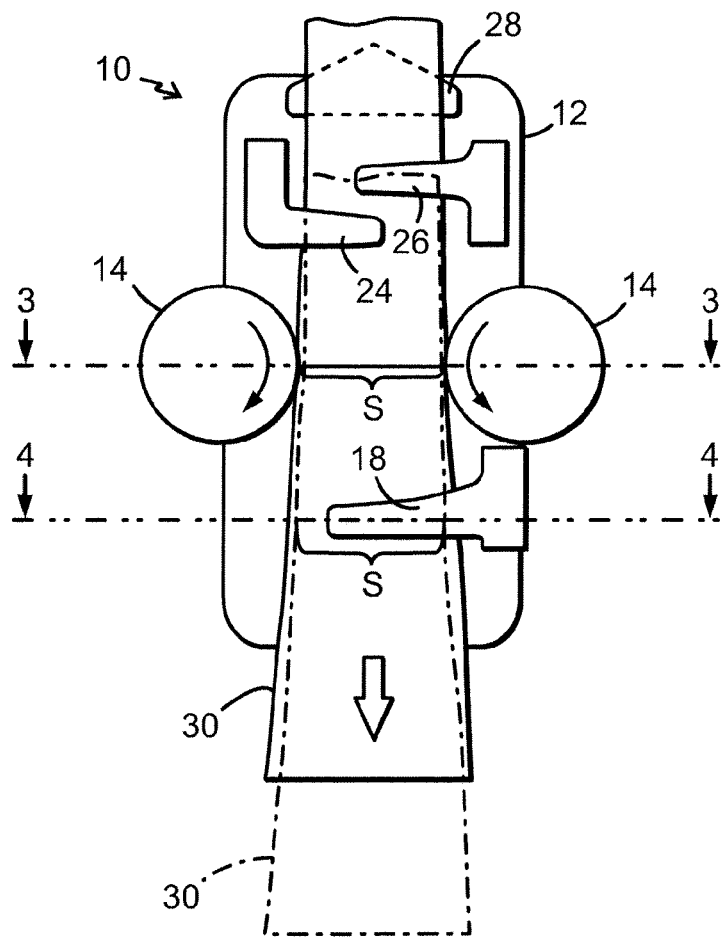
FIG. 2 is a diagrammatic front view of a harvesting assembly illustrating the principles of the invention.

In FIG. 1, a harvesting assembly 10 is shown of a so-called single-grip type. The assembly 10 comprises a frame 12, which supports, among other things, a pair of opposite feed wheels 14, a lower delimbing knife 18 a pair of upper front delimbing knives 24, 26 and an upper rear delimbing knife 28.

Figure 3:
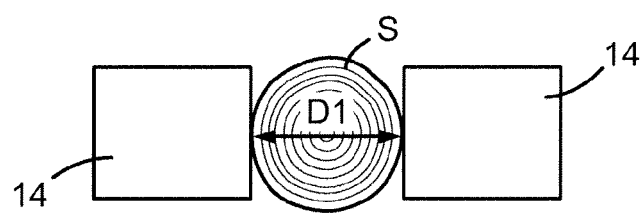
FIGS. 3 and 4 are diagrammatic section views along the lines 3-3 and 4-4, respectively, in FIG. 2.

The two feed wheels 14 are pivotably connected to the frame 12 in order to, in a known way, between themselves clamp and in the longitudinal direction feed a tree trunk 30 felled by the assembly 10 (FIG. 3). The likewise pivotable delimbing knives 18, 24, 26, 28 simultaneously surround the tree trunk 30 for the separation of knots during the feed.

Each feed wheel 14 and the delimbing knives 18, 24, 26, 28 are set to the positions thereof surrounding the tree trunk by means of actuators such as hydraulic cylinders. In the example shown in FIG. 1, the feed wheels 14 are set by the respective hydraulic cylinders 16 and the lower delimbing knife 18 are also set by a hydraulic cylinder 20.

The pivotal position of each feed wheel 14 is detected by the respective position indicator 40 that may be incorporated with the corresponding hydraulic cylinder 16. The pivotal position of the lower delimbing knife 18 is detected by a position indicator 42, which also may be incorporated with the corresponding hydraulic cylinder 20. Signal transfer means such as signal lines 44 signal the current travel of the hydraulic cylinders 16, 16, 20, i.e., the extent of projection of the piston rod of the cylinder, to a calculation unit 46, such as a computer in an electronic control unit 48, which may be incorporated in the vehicle, not shown, carrying the harvesting assembly 10.

By means of a software of the calculation unit 46, the current stroke position or travel of each one of the hydraulic cylinders 16 of the feed wheels 14 can be converted into a distance D1 (FIG. 3) between the feed wheels 14. The distance D1 is a measure of a transverse dimension of the cross-section S of the tree trunk that is between the feed wheels 14.

Figure 4:
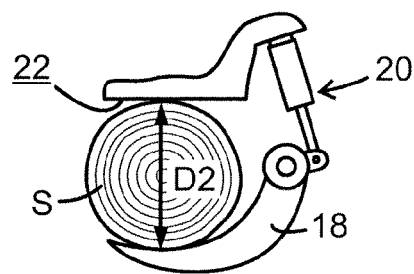

Correspondingly, by means of the software of the calculation unit 46, the current travel of the hydraulic cylinder 20 of the lower delimbing knife 18 can be converted into a distance D2 (FIG. 4) between the lower delimbing knife 18 and a fixed or possibly movable (not shown) abutment surface 22 opposite thereto of the frame 12 of the harvesting assembly 10. The distance D2, which is measured essentially perpendicularly to the distance D1, is a measure of a transverse dimension of the cross-section S of the tree trunk that is between the delimbing knife 18 and the abutment surface 22. During operation, the tree trunk 30 usually rests against the currently lowest point of the concave surface of the lower delimbing knife 18. Having knowledge about the geometry of the delimbing knife 18, the software of the calculation unit 46 makes sure that the distance D2 always is measured between this lowest point and the abutment surface 22.

A length measuring device, not shown in more detail, comprising a measuring wheel 50 (FIG. 1) can detect the length movement position in question of the tree trunk 30 in the harvesting assembly 10 and signal this to the calculation unit 46. The software of the calculation unit 46 then can—if considered necessary for the measuring accuracy—by means of this current length movement position pair together all measured transverse dimensions, i.e., a plurality of measured D1's and a plurality of measured D2's, so that D1 and D2 of each pair belongs to a common certain cross-section S of the tree trunk.

The measures D1 and D2 obtained thereby are used for the estimation in the calculation unit 46 of the thickness of the tree trunk 30 in each measured cross-section S. For instance, the mean value of the measures—as well as in cross calipering—may be used as a measure of the thickness of the tree trunk 30.

The detailed description above is primarily intended to facilitate the understanding and no unnecessary limitations of the invention should be interpreted therefrom. The modifications that will be obvious for one skilled in the art upon examination of the description may be carried out without deviating from the general idea of the invention or the scope of the subsequent claims.

The invention claimed is:

1. A method for the determination of a thickness of a cross-section (S) of a tree trunk received in a harvesting assembly, the method comprising:
  engaging the tree trunk with a pair of feed wheels used to feed the tree trunk through the harvesting assembly, with the feed wheels engaging opposite sides of the tree trunk along a first diameter corresponding to a first direction,
  abutting a delimbing knife against the tree trunk opposite a side of the tree trunk abutting an abutment surface, with the delimbing knife and abutment surface engaging diametrically opposite sides of the tree trunk essentially along a second diameter of the tree trunk corresponding to a second direction perpendicular to the first direction,
  detecting the positions of the feed wheels relative to one another as a measure of the first diameter of the tree trunk,
  detecting the position of the delimbing knife in relation to an abutment surface as a measure of second diameter of the tree trunk at right angle to the first diameter, and
  estimating the thickness of the cross-section of the tree trunk based on the first and second diameters, wherein the thickness is calculated as a diameter value in the form of a mean value of the first and second diameters.

2. The method according to claim 1, wherein the abutment surface is stationary in the harvesting assembly.

3. The method according to claim 1, wherein the feed wheels are rotatably driven to advance the tree trunk in a feed direction, and the abutment surface and delimbing knife are located downstream of the feed wheels in relation to the feed direction.

* * * * *